United States Patent

Willuweit

[15] 3,648,852
[45] Mar. 14, 1972

[54] AIR CUSHION SUPPORT APPARATUS FOR TRANSFER STRUCTURE

[72] Inventor: Werner Willuweit, St. Clair Shores, Mich.

[73] Assignee: La Salle Machine Tool, Inc., Warren, Mich.

[22] Filed: Mar. 5, 1970

[21] Appl. No.: 16,693

[52] U.S. Cl. .......................... 214/1 BE, 104/23 FS, 302/17
[51] Int. Cl. .................................................. B65g 35/00
[58] Field of Search ..................... 214/1, 1 BE; 302/17, 29; 104/23 FS, 134

[56] References Cited

UNITED STATES PATENTS

| | | | |
|---|---|---|---|
| 3,452,883 | 7/1969 | Watters | 302/29 X |
| 1,411,597 | 4/1922 | Trask | 104/23 FS |
| 2,651,549 | 9/1953 | Ross | 214/1 AB |
| 2,315,627 | 4/1943 | Lamb | 214/1 AB |
| 3,457,874 | 7/1969 | Tezuka et al. | 214/1 AB X |

Primary Examiner—Gerald M. Forlenza
Assistant Examiner—Frank E. Werner
Attorney—Olsen and Stephenson

[57] ABSTRACT

Apparatus comprising a pair of parallel slide rails having flat horizontal top surfaces on which workpiece carrying pallets are slidably mounted. A plurality of upright air passages terminate in discharge ports in the rail top surfaces and the ports are spaced longitudinally on the rails, a spring loaded ball valve member being disposed in each passage for movement to a seated position closing the passage. The ball valve member projects slightly above the flat slide surfaces on the rails so that when a pallet is moved horizontally on the rails, engagement of the pallet with a projecting ball valve member provides for opening of the corresponding air passage port so that air can issue therefrom and provide the desired air cushion between the pallet and the rails to facilitate horizontal movement of the pallet on the rails.

1 Claim, 3 Drawing Figures

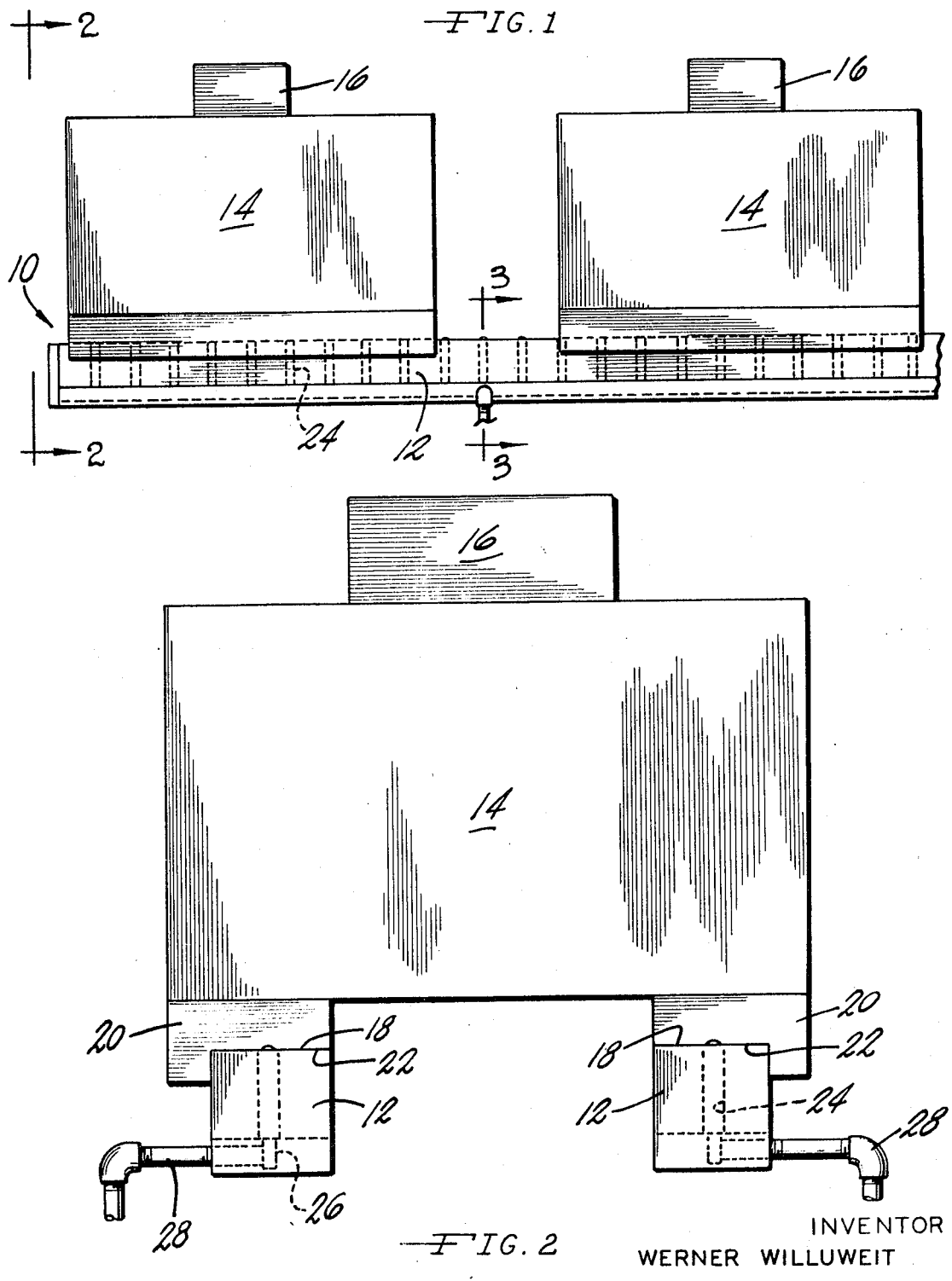

INVENTOR
WERNER WILLUWEIT

AIR CUSHION SUPPORT APPARATUS FOR TRANSFER STRUCTURE

BACKGROUND OF THE INVENTION

In certain automation equipment, it is conventional to mount the workpieces on pallets which are in turn slidably supported on rails which extend past a plurality of work stations. The pallets are progressively moved along the rails to positions adjacent to a series of machine tools at the work stations which perform successive machining operations on the workpieces carried by the pallets. When adjacent to a machine tool, the pallet is located for the purpose of positioning the workpiece with respect to the machine tool which is to perform the work, and the pallet is then clamped in the located position. Ease of movement of the pallets between successive work stations is desirable, and for this reason past practice in some situations has been to provide upwardly directed air passages in slide rails which function to provide, when supplied with air under pressure, an air cushion between each pallet and the slide rails so that less force is required to move the pallet along the slide rails. However, since the pallets are spaced apart on the rails, past arrangements of this type have necessarily involved a waste of air issuing from the air passages located between pallets. In addition, many of the machine operations on the workpieces carried by the pallets involve a continual supply of liquid coolant to the machine tools and the air issuing from the air passages between pallets can spray this coolant for considerable distances causing undesirable mess and endangering personnel and machinery. Furthermore, air passages of this type are subject to becoming clogged with dirt and the like when the transfer structure is shut down and there is no cleaning air issuing from the air passages. It is an object of the present invention, therefore, to provide apparatus capable of providing the desired air cushion support for the pallets which does not waste air through air passages located between pallets, does not cause an undesirable spray of coolant, and is not subject to becoming clogged when the apparatus is not in use.

SUMMARY OF THE INVENTION

In the apparatus of this invention, the horizontal slide rails are provided with a plurality of longitudinally spaced air passages which terminate in discharge ports located in the flat top surfaces of the rails. A ball valve member is positioned in each air passage and is urged to a seated position in which it closes the discharge port by a spring located within the air passage. When each ball member is seated, it projects slightly above the rail top surface. Consequently, when the ball member is engaged by a pallet on the rails, the ball member is forced downwardly, against the pressure of the spring so as to open the air discharge port. This arrangement provides the necessary supply of air for forming the support cushion under each pallet but also provides for automatic closing of the ports located between pallets. In addition, when the apparatus is shut down, the springs provide for closing of exposed ports so that foreign matter cannot accumulate therein. Thus, the apparatus of this invention provides the desired air cushion supports for the pallets without endangering men and equipment with sprayed coolant, without wasting air, and with no danger that some of the ports will become clogged so as to reduce the efficiency of the desired air cushion.

Further objects, features and advantages of this invention will become apparent from a consideration of the following description, the appended claims, and the accompanying drawing in which:

FIG. 1 is a fragmentary side view of transfer structure showing pallets mounted on slide rails provided with the air cushion forming apparatus of this invention;

FIG. 2 is an enlarged end view of the apparatus of this invention as seen from substantially the line 2—2 in FIG. 1.

Figure 3:
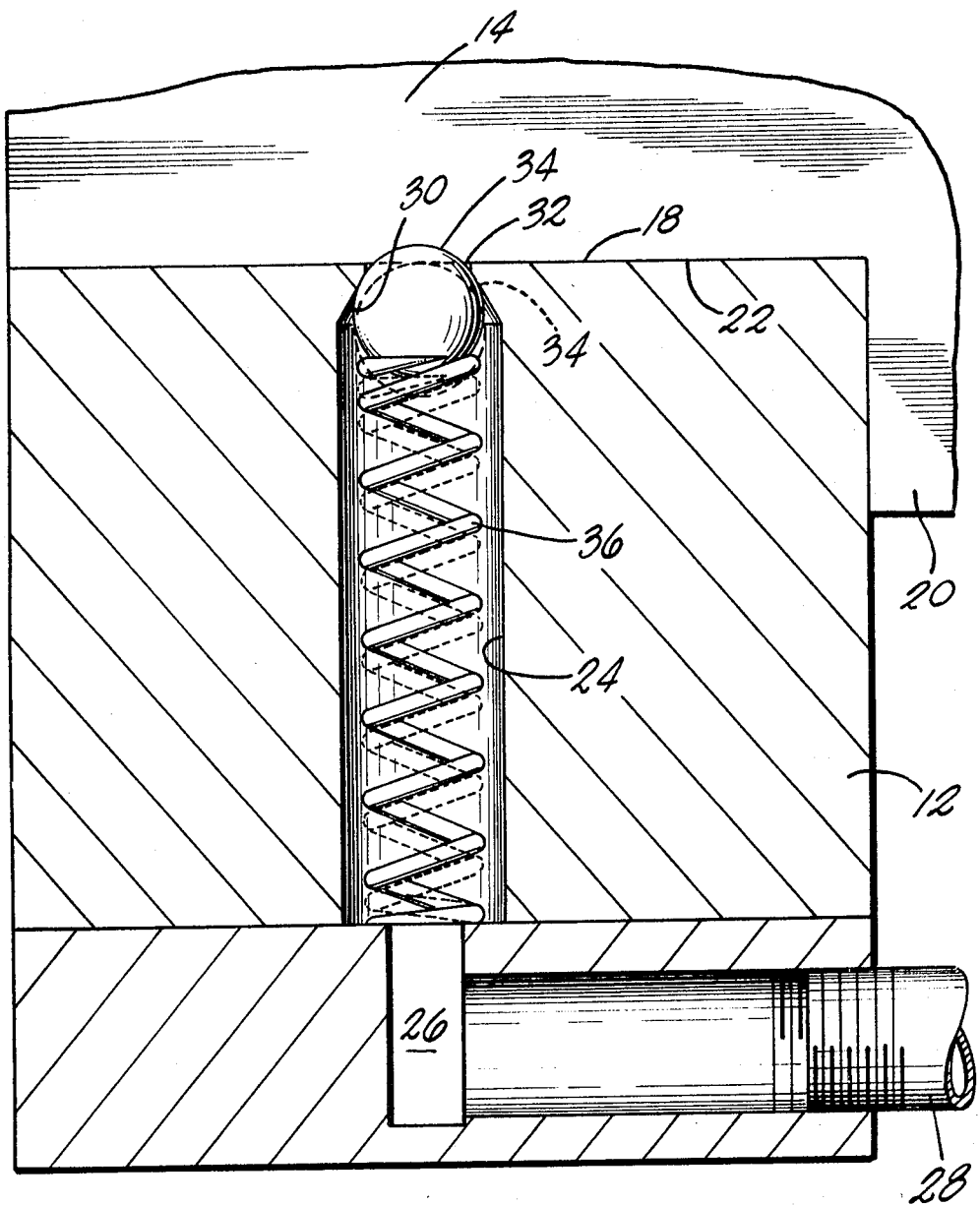
FIG. 3 is an enlarged transverse sectional view of a slide rail in the apparatus of this invention as seen from substantially the line 3—3 in FIG. 1, and showing a fragmentary portion of a pallet mounted thereon.

With reference to the drawing, the apparatus of this invention, indicated generally at 10, is illustrated in FIGS. 1 and 2 as including a pair of slide rails 12 on which pallets 14 are slidably mounted, the pallets 14 being shown in somewhat diagrammatic form. Each pallet 14 carries a workpiece 16, which is likewise shown in diagrammatic form, for moving the workpiece 16 between successive work stations which are spaced apart in a horizontal direction. The rails 12 are of substantial length and are substantially parallel, each rail 12 having a flat horizontally extending top surface 18. Each pallet 14 has support legs 20 each of which has a flat surface 22 slidably supported on a rail surface 18. Horizontal movement of the pallets 14 is facilitated by the provision of air cushions between the flat surfaces 18 and 22 which are precision machined to mate and accommodate an air cushion between.

The desired air cushion is provided between the surfaces 18 and 22 by the provision of plurality of upwardly extending air supply passages 24 in each of the rails 12. As shown in FIG. 1, the passages 24 are spaced apart in a direction longitudinally of the rails 12 and are provided in sufficient numbers so that a plurality of passages 24 are aligned with each pallet 14. At their lower ends, the passages 24 in each rail 12 are connected to a longitudinally extending air supply conduit 26 which is in turn connected by a pipe 28 to a supply of compressed air effective to supply air under pressure to the conduits 26. The desired air under pressure for the upwardly extending air supply passages 24 is thus supplied by the pipes 28 which are provided in numbers depending on the lengths of the rails 12.

As shown in FIG. 3, each air passage 24 is of generally cylindrical shape, terminating at its upper end in an annular seat 30 which is of progressively decreasing diameter in cross section and of generally frusto conical shape. At the surface 18, the passage 24 terminates in a discharge port 32 adapted to be closed by a ball valve member 34 when the ball member 34 is sealingly engaged with the seat 30, as shown in solid lines in FIG. 3. A compression spring 36 in the passage 24 engages the ball valve member 34 and normally holds the ball valve member 34 in sealing engagement with the seat 30. When the ball valve member 34 is engaged with the seat 30, it projects above the surface 18 a distance less than the diameter of the ball member 34. As a result, when a ball member 34 is engaged by the surface 22 on the pallet 14, the ball valve member 34 is depressed in the passage 24 to the broken line position shown in FIG. 3, causing a corresponding compression of the spring 36. In the depressed position of the ball valve member 34, the port 32 is opened so that air under pressure from the passage 24 can issue from the port 32 to form the desired air cushion between the surfaces 18 and 22.

It can thus be seen that in the use of the apparatus 10, all of the ports 32 for the passages 24 which are below the pallet 14 are open so that air issuing therefrom can form the desired cushion between the surfaces 18 and 22. The ports 32 are uniformly spaced in a direction longitudinally of the rails 12 so that the air cushion on which the pallets 14 are supported applies an upwardly directed force to each pallet 14 which is at all times of substantially the same magnitude. The ports 32 for the passages 24 which are between the pallets 14 are at all times closed by the ball members 34 therefor so that no air is issuing from these discharge ports 32. As a result, none of the air being supplied from the inlet pipes 28 is being wasted during use of the apparatus 10, since all of the air is being used to form the desired air cushion on which the pallets 14 are supported. Furthermore, all of the discharge ports 32 which are accessible to any of the liquid coolant in the area of the pallets 14 are closed by the ball valve members 34 therefor. Consequently, none of the air being supplied to the apparatus 10 can function to project coolant coming in contact therewith, thereby eliminating potential safety and cleanliness problems.

In addition, the air from the discharge ports 32 eliminates wear of the rail and pallet surfaces 18 and 22, respectively. Whenever the apparatus 10 is shut down, all of the discharge ports 32 which are not covered by pallets 14 are closed by the ball valve members 34 therefor, and as a result dirt and other contaminants can never accidentally fall into the passages 24 so as to clog the passages and cause a nonuniform air cushion support for a pallet 14.

What is claimed is:

1. Work moving apparatus comprising a pair of substantially parallel slide rails having upwardly facing flat horizontal top surfaces, a plurality of upright air passages terminating in discharge ports located in said top surfaces and spaced longitudinally of said rails, means in each of said passages forming a ball seat adjacent the discharge port for said passage, a ball valve member in each of said passages of a size to project above said top surface a distance less than the diameter of said ball member when seated against the seat in said passage, means in each of said passages urging the ball member therein into substantially sealing engagement with the seat therein, and a work carrying pallet having downwardly facing flat horizontal bottom surfaces disposed above and supported on said side rail top surfaces in the absence of air from said air passages between said top and bottom surfaces, said top and bottom surfaces being precision machined to mate and accommodate an air cushion therebetween when air is supplied between said surfaces from said air passages, said ball valve members projecting into the path of said pallet so that said pallet is operable to depress ball valve members engaged thereby so as to open the discharge ports normally closed by said ball valve members and provide for said supply of air between said surfaces.

* * * * *